(12) United States Patent
Gamble et al.

(10) Patent No.: US 10,046,850 B2
(45) Date of Patent: Aug. 14, 2018

(54) AIRCRAFT WING SHIFT DEVICE

(71) Applicant: Lockheed Martin Corporation, Bethesda, MD (US)

(72) Inventors: Dustin Eli Gamble, San Luis Obispo, CA (US); Matthew Curran, San Luis Obispo, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 181 days.

(21) Appl. No.: 15/088,615

(22) Filed: Apr. 1, 2016

(65) Prior Publication Data

US 2017/0283033 A1 Oct. 5, 2017

(51) Int. Cl.
- *B64C 3/42* (2006.01)
- *B64C 1/26* (2006.01)
- *B64C 39/02* (2006.01)

(52) U.S. Cl.
CPC ............... *B64C 3/42* (2013.01); *B64C 1/26* (2013.01); *B64C 39/024* (2013.01); *B64C 2201/028* (2013.01); *B64C 2201/10* (2013.01)

(58) Field of Classification Search
CPC .......... B64C 1/26; B64C 3/42; B64C 39/024; B64C 2201/028; B64C 2201/10
See application file for complete search history.

(56) References Cited

U.S. PATENT DOCUMENTS

| | | | |
|---|---|---|---|
| 1,791,868 A * | 2/1931 | Henning | B64C 17/00 244/93 |
| 1,819,948 A | 8/1931 | Diago | |
| 1,916,813 A * | 7/1933 | Sessa | B64C 23/005 244/46 |
| 2,001,158 A * | 5/1935 | Koca | B64D 27/08 244/54 |
| 2,074,897 A * | 3/1937 | Everts | B64C 3/40 244/102 A |
| 2,683,574 A * | 7/1954 | Peterson | B64C 3/40 244/46 |
| 3,285,540 A * | 11/1966 | Shag-Tang Lee | B64C 3/38 244/131 |
| 3,381,918 A * | 5/1968 | Jacquart | B23D 15/14 244/46 |
| 3,405,891 A * | 10/1968 | Jacquart | B64C 3/38 244/218 |
| 4,139,172 A | 2/1979 | Miller et al. | |
| 7,185,847 B1 * | 3/2007 | Bouchard | F42B 10/12 244/3.28 |
| 8,360,357 B2 | 1/2013 | Cazals et al. | |
| 2011/0036941 A1 * | 2/2011 | Cazals | B64C 3/38 244/46 |

FOREIGN PATENT DOCUMENTS

EP  2860100 A1  10/2014

OTHER PUBLICATIONS

Extended European Search Report in European Patent Application No. 17163331.6-1754, dated Sep. 11, 2017, 8 pages.

* cited by examiner

*Primary Examiner* — Justin M Benedik
(74) *Attorney, Agent, or Firm* — Baker Botts L.L.P.

(57) ABSTRACT

An aerial vehicle includes a fuselage, a wing, and a wing shift device. The wing shift device is configured to be coupled to the fuselage. The wing shift device comprises a plurality of apertures for coupling the wing to the aerial vehicle. The plurality of apertures are configured to permit the wing to be shifted in a forward or aft direction along the fuselage based on a center of gravity of the aerial vehicle.

20 Claims, 7 Drawing Sheets

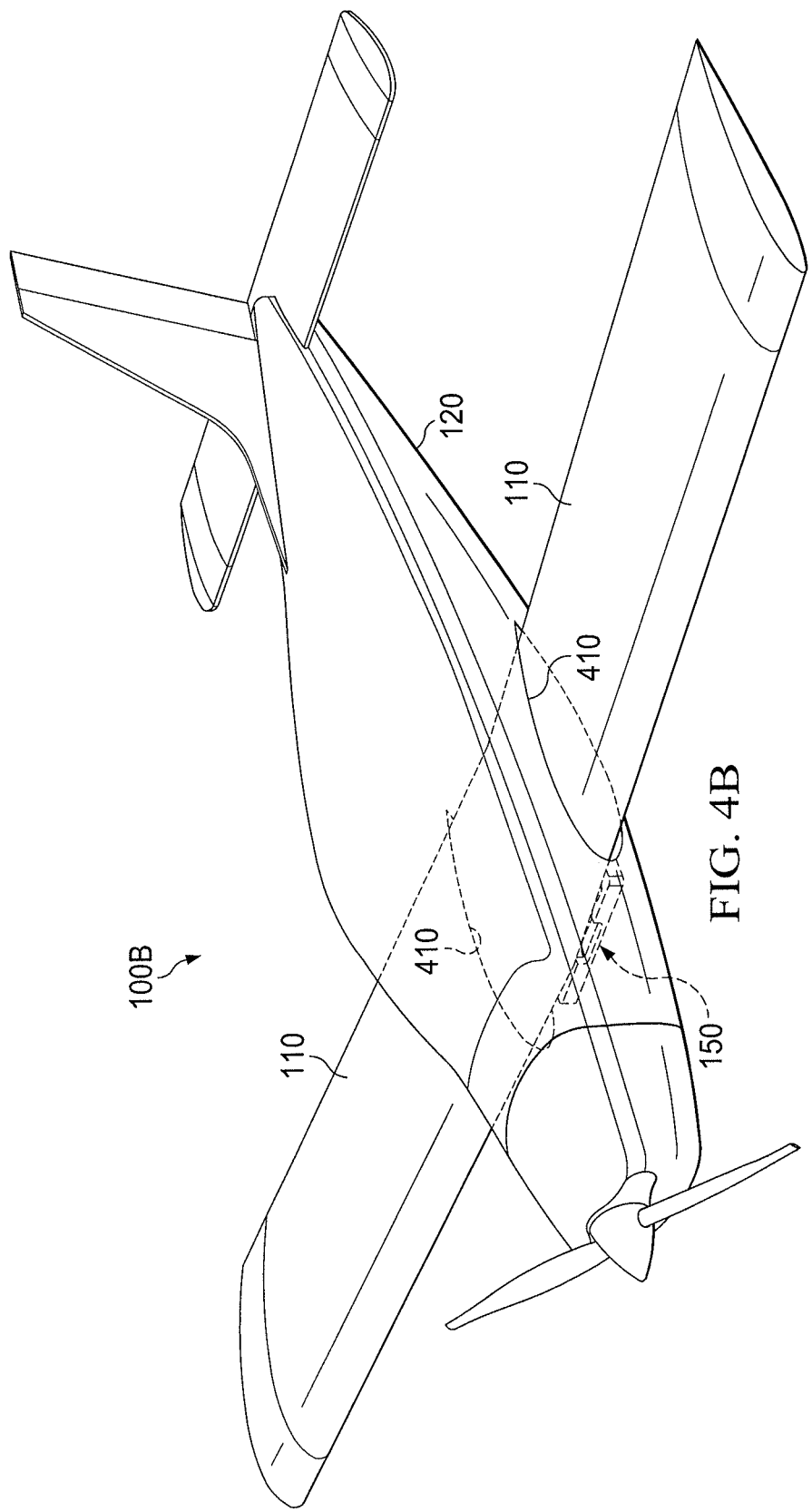

AIRCRAFT WING SHIFT DEVICE

TECHNICAL FIELD

This disclosure relates in general to aircraft and more particularly to an aircraft wing shift device.

BACKGROUND

Balance and stability of an aircraft is affected by the aircraft's center of lift and center of gravity. To maintain balance and stability, the optimal position for the center of gravity is at or near the aircraft's center of lift. Thus, an aircraft is balanced when its center of lift and center of gravity align within a balance range.

Generally, the center of lift is set by the primary lifting surface, which is typically the aircraft's main wing. The position of an aircraft's center of gravity varies depending on the aircraft's weight distribution. More specifically, an aircraft's center of gravity moves forward or aft relative to the fuselage to a point where all weight is concentrated.

SUMMARY OF THE DISCLOSURE

According to one embodiment, an unmanned aerial vehicle ("UAV") comprises a fuselage, a wing, and a wing shift device. The wing shift device is configured to be coupled to the fuselage and comprises a plurality of apertures for coupling a wing to the UAV. The plurality of apertures are configured to permit the wing to be shifted in a forward or aft direction along the fuselage based on the center of gravity of the UAV.

Technical advantages of certain embodiments may include providing increased payload capacity and increased aircraft performance. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which:

FIGS. 4A-4D illustrate example uses of the wing shift device of FIG. 1, according to embodiments of the present disclosure.

DETAILED DESCRIPTION OF THE DISCLOSURE

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4D, where like numbers are used to indicate like and corresponding parts.

Aircraft, including unmanned aerial vehicles ("UAV"s), commonly carry weight onboard in the form of fuel, passengers, luggage, equipment, etc. Onboard weight unbalances an aircraft by moving the center of gravity from its optimal location to an unsafe position (i.e., outside the aircraft's balance range). To counter this effect, an aircraft may require ballast. Ballast is weighted material added to the aircraft to reposition the center of gravity at its optimal position (i.e., within the aircraft's balance range). Ballast is usually added in the nose or tail of the aircraft, but may be added anywhere along the aircraft. Although ballast may successfully rebalance an aircraft, using ballast presents certain disadvantages. For example, ballast reduces payload capacity because it decreases the amount of usable space within an aircraft. Another disadvantage of using ballast is that ballast significantly decreases aircraft performance. Weight burdens aircraft performance because the aircraft's total weight must be offset by lift in order for the aircraft to become aloft. Thus, an aircraft carrying ballast must produce additional lift to compensate for the extra, unusable onboard weight. Accordingly, there is a need for a solution to balancing an aircraft that does not reduce payload capacity or significantly diminish aircraft performance.

The teachings of the disclosure recognize that these and other problems of typical aircraft may be reduced or eliminated by using an aircraft wing shift device to accommodate changes in payload and center of gravity. The following describes a wing shift device for providing these and other desired features.

Figure 1:
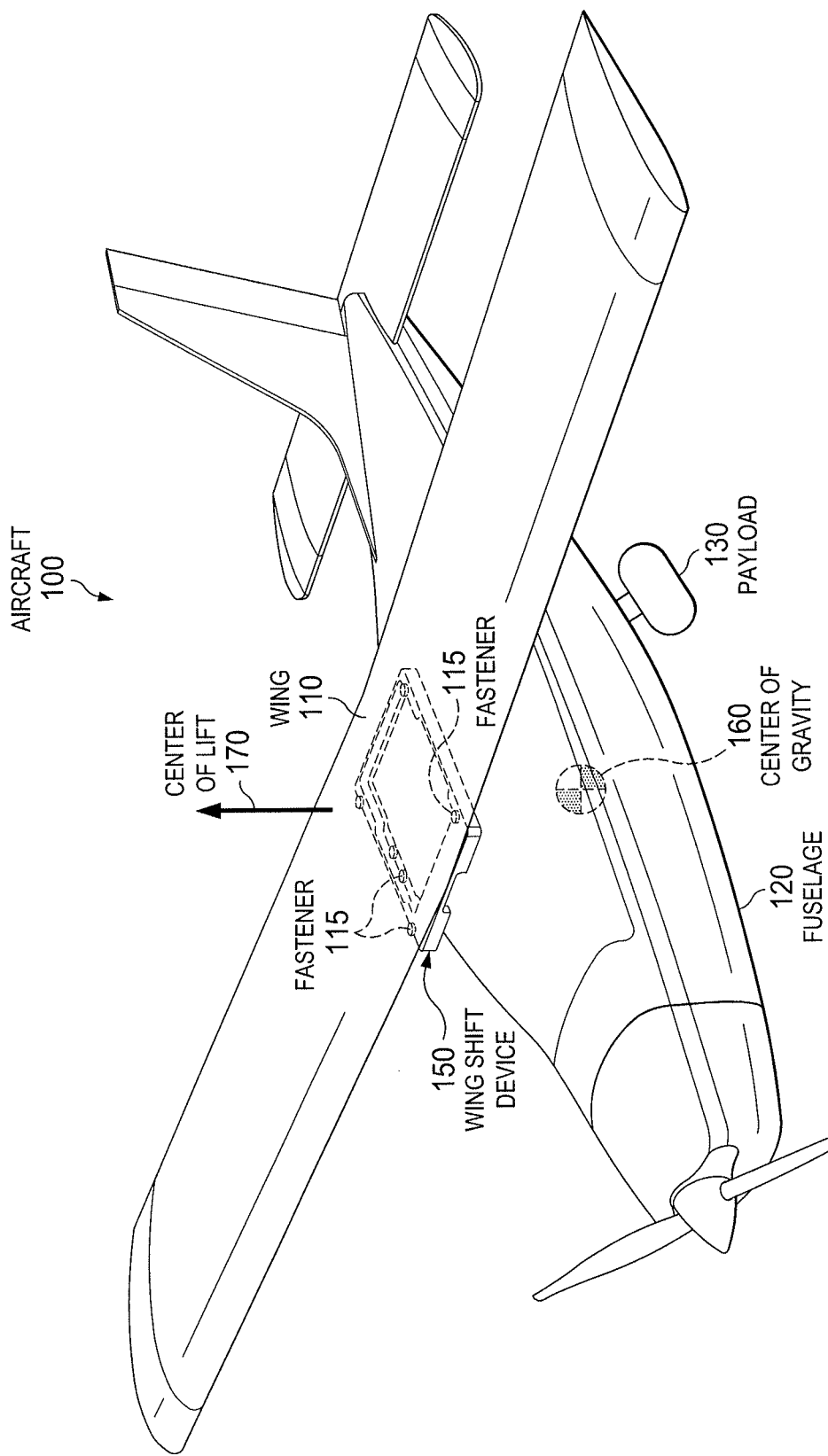
FIG. 1 illustrates an example wing shift device coupled to an aerial vehicle, according to embodiments of the present disclosure.

FIG. 1 illustrates an example wing shift device 150 coupled to an aircraft 100, according to certain embodiments of the present disclosure. Aircraft 100 includes a fuselage 120 carrying a payload 130. In this embodiment, wing shift device 150 is coupled to a top portion of fuselage 120. A wing 110 is affixed to the distal surface of wing shift device 150.

In general, wing shift device 150 is coupled to fuselage 120 and wing 110 of aircraft 100 and permits wing 110 to be shifted forward or aft along fuselage 120 in order to accommodate changes in payload 130 and a center of gravity 160. Wing shift device 150 may be coupled to any appropriate portion of aircraft 100, as described in more detail below in reference to FIGS. 4a-4d. Aircraft 100 may be any appropriate aircraft, including, but not limited to, a UAV.

As described above, wing 110 defines a center of lift 170 for aircraft 100. In some embodiments, wing 110 is the main wing of aircraft 100. As depicted in FIG. 1, center of lift 170 for aircraft 100 is set by wing 110. FIG. 1 shows aircraft 100 having a high wing mount (i.e., wing 110 is coupled to a top portion of fuselage 120). This disclosure contemplates additional embodiments including aircraft having mid wing mounts, low wing mounts, and side wing mounts as explained in detail below in reference to FIGS. 4A-4D.

In some embodiments, fuselage 120 is the central structure or main body of aircraft 100. In typical aircraft, fuselage 120 is coupled to wing 110 and is the section of the aircraft that contains or supports payload 130. In the illustrated embodiment, fuselage 120 is torpedo-shaped (i.e., tubular in shape with tapered ends). However, this disclosure recognizes that fuselage 120 may have any appropriate shape or dimensions.

In some embodiments, aircraft 100 includes payload 130. Generally, the positioning of payload 130 is given careful consideration because, as explained above, good balance of aircraft 100 is required in order to ensure maneuverability, controllability, and efficiency of the aircraft during flight. In most cases, payload 130 changes depending on the nature of the aircraft's flight. For example, in some commercial aircraft embodiments, payload 130 may include crew, passengers, luggage, fuel, and equipment. In UAV embodiments, payload 130 may include a power source (e.g., battery), a controller, and a camera. As depicted, payload 130 is coupled to the underside of fuselage 120 near the tail of aircraft 100. Although payload 130 is depicted in a particular position in FIG. 1, a person of ordinary skill in the art will recognize that payload 130 can be positioned anywhere along or within fuselage 120. Moreover, payload 130 may be distributed throughout fuselage 120. For example, payload 130 of aircraft 100 may include cargo and crew wherein the cargo is positioned near the tail and crew is positioned near the nose of aircraft 100. Thus, this disclosure recognizes payload 130 may change depending on the nature of flight of aircraft 100 and that the addition, change, or removal of payload 130 effects the distribution of weight of aircraft 100.

In general, wing shift device 150 may be coupled by any appropriate means to any appropriate portion of fuselage 120. Although wing shift device 150 is illustrated in FIG. 1 as being mounted to the top of fuselage 120, this disclosure contemplates mounting wing shift device 150 to any suitable portion of fuselage 120 (e.g., the embodiments illustrated in FIGS. 4A-4D). In some embodiments, wing shift device 150 is permanently coupled to fuselage 120. Permanent mounting may include welding, soldering, fusing, cementing, joining by adhesive or any other suitable method of permanently anchoring wing shift device 150 to fuselage 120.

In some embodiments, wing shift device 150 is removably coupled to fuselage 120. Fasteners 115 (e.g., 115*a-d*) may be used to couple wing shift device 150 to fuselage 120. Fasteners 115 may include bolts, buttons, buckles, ties, clamps, clasps, nails, pegs, and/or screws. Fasteners 115 may also include any other suitable device that mechanically affixes wing shift device 150 to fuselage 120. In some embodiments, thumb screws 115 may be used for low cost, ease of use, and efficiency. In other embodiments, heavy duty fasteners 115 are used. In some embodiments, fasteners 115 may require tooling or equipment to ensure a secure coupling. The type of fastener 115 employed may be based on an aircraft concern (e.g., weight of aircraft or its components, use of aircraft, etc.).

In general, wing shift device 150 is used to affix wing 110 to aircraft 100. Wing 110 may be permanently or removably affixed to wing shift device 150. Fasteners 115 may be used to couple wing 110 to wing shift device 150.

In some embodiments, wing shift device 150 may be constructed from carbon fiber, carbon nanotube, cellulose nanocrystals, kevlar, plastic, metal, and/or any combination of these materials. This disclosure recognizes constructing wing shift device 150 from any suitable material. Preferably, wing shift device 150 is made from a material that is sturdy and lightweight.

The shape and size of wing shift device 150 may vary according to different uses and configurations of aircraft 100. For example, wing shift device 150 on an aircraft weighing 250 grams may be square in shape and have a length of 2 inches. In comparison, wing shift device 150 on an aircraft weighing 750 kilograms may be rectangular in shape and have a length of 2 feet. This disclosure recognizes that aircraft are of a variety of shapes and sizes and wing shift device 150 may be any appropriate shape and size according to the aircraft that utilizes wing shift device 150.

Figure 2:
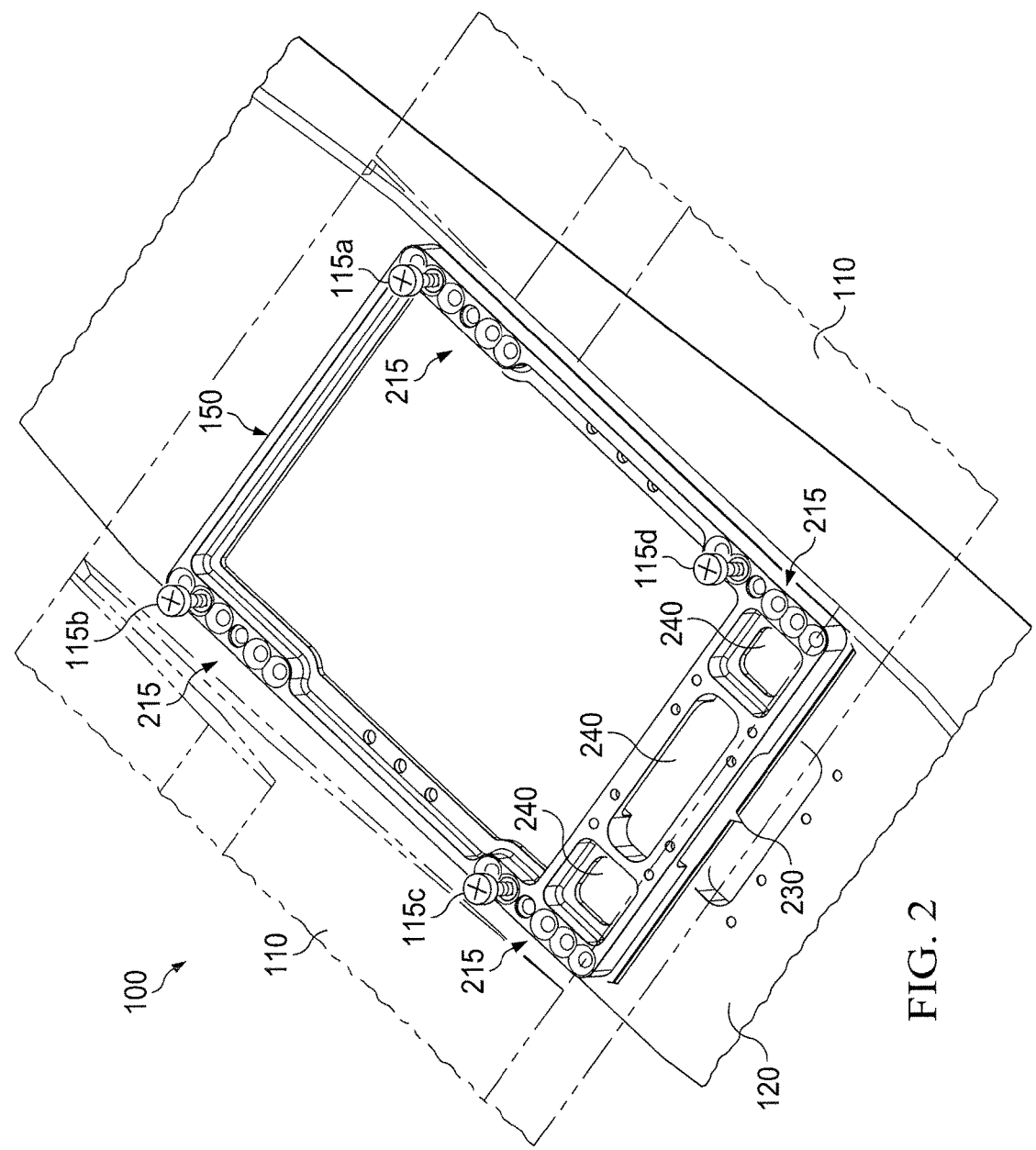
FIG. 2 is a plan view of the wing shift device of FIG. 1, according to embodiments of the present disclosure.
Figure 3:
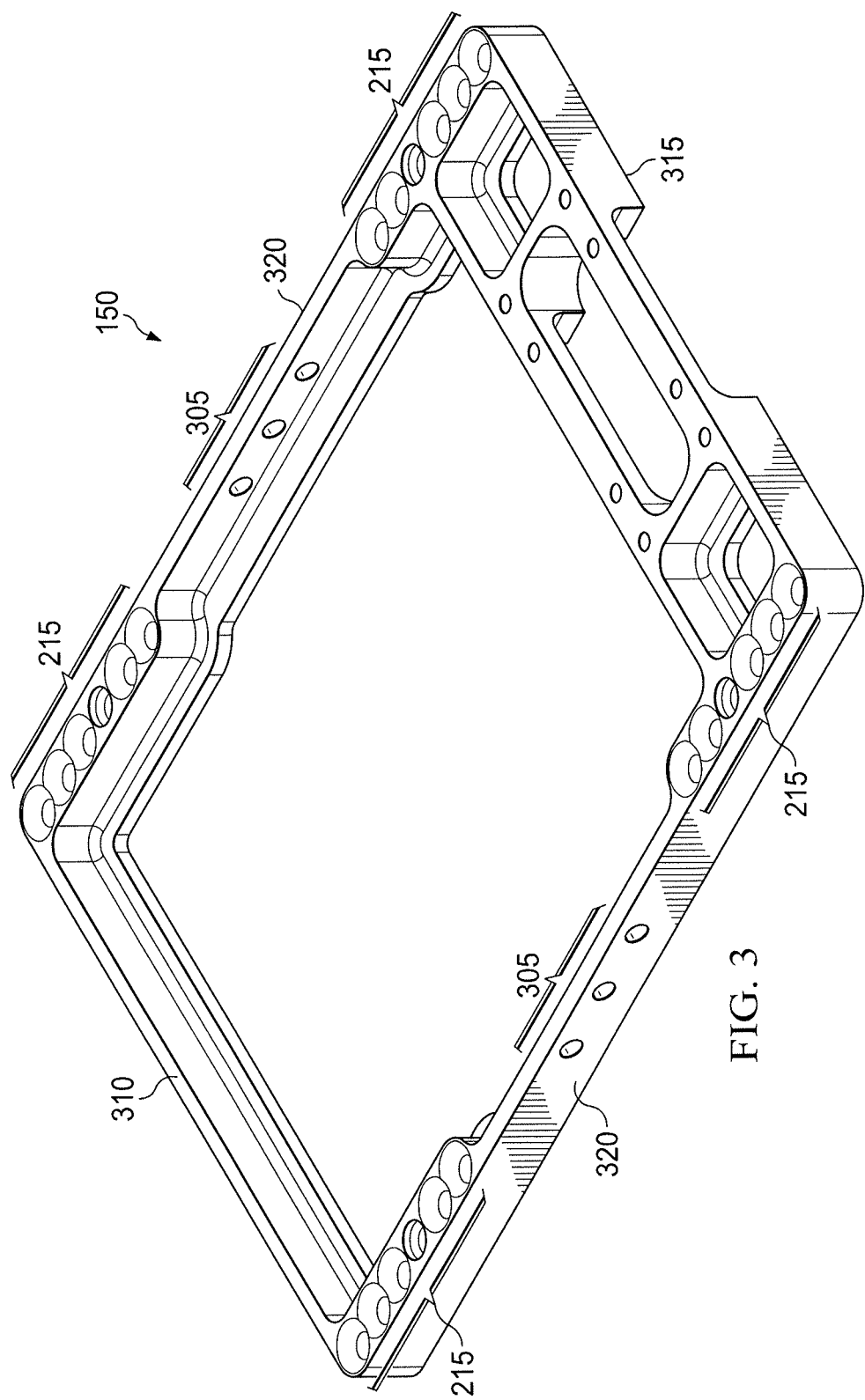
FIG. 3 is another view of the example wing shift device of FIG. 1, according to embodiments of the present disclosure.

As illustrated in FIGS. 2-3, wing shift device 150 may include a plurality of apertures 215 and 305 for coupling wing shift device 150 to fuselage 120 and for coupling wing 110 to wing shift device 150. The size and shape of apertures 215 and 305 may vary according to aircraft concerns (e.g., size of aircraft, weight of aircraft, use of aircraft, fastener used, etc.). In some embodiments, apertures 215 are preconfigured for particular payloads 130. For example, when aircraft 100 carries payload 130 comprising a camera, wing 110 may be affixed to a preconfigured first set of apertures 215 of wing shift device 150. As another example, when aircraft 100 carries payload 130 comprising a global positioning system ("GPS"), wing 110 may be affixed to a preconfigured second set of apertures 215 of wing shift device 150. Preconfiguration may result in increased efficiency when adjusting wing 110 along wing shift device 150.

In some embodiments, wing shift device 150 may include various utility and/or design features. For example, in some embodiments, wing shift device 150 may include an aeroskirt 230. Aeroskirt 230 may be defined by the contour of wing shift device 150. Generally, aeroskirt 230 may prevent air from travelling between wing shift device 150 and fuselage 120. Thus, aeroskirt 230 may decrease drag, thereby increasing aircraft performance. As another example, in some embodiments, wing shift device 150 may include storage solutions. Storage solutions, such as compartments 240, may also be defined by the contour of wing shift device 150. As one example, compartments 240 may accommodate electrical or pneumatic connectors associated with wing 110. Establishing storage solutions integral with wing shift device 150 may further increase the payload capacity of aircraft 100.

As described above, wing 110 may be coupled to wing shift device 150. In some embodiments, wing 110 is permanently coupled to wing shift device 150. In other embodiments, wing 110 is removably coupled to wing shift device 150. In some embodiments, wing 110 is coupled to wing shift device 150 using fasteners 115. As illustrated in FIGS. 2-3, wing shift device 150 may include a plurality of apertures 215 that permit wing 110 to be affixed to a top surface 310 of wing shift device 150 or to side surfaces 320 of wing shift device 150.

To accommodate changes in payload 130 and center of gravity 160, it may be advantageous to change the position of wing 110 by shifting it along fuselage 120 using apertures 215 or 305 of wing shift device 150. Therefore, in some embodiments, wing 110 is shifted and secured to wing shift device 150 based on a change in center of gravity 160 of aircraft 100. For example, in FIG. 1, payload 130 may be secured to fuselage 120 near the tail of aircraft 100. As a result, center of gravity 160 of aircraft 100 is shifted aft and causes a misalignment of center of lift 170 and center of gravity 160. Because center of lift 170 is set by wing 110, adjusting the position of wing 110 adjusts the position of center of lift 170 of aircraft 100. Therefore, moving wing 110 aft along wing shift device 150 moves center of lift 170 of aircraft 100. Proper positioning of wing 110 realigns center of gravity 160 with center of lift 170 and ensures balance of aircraft 100.

Coupling wing 110 to wing shift device 150 may be achieved manually. In some embodiments, wing 110 may include a plurality of apertures that correspond to apertures 215 or 305 of wing shift device 150. In some embodiments, apertures of wing 110 are aligned with apertures 215 of wing shift device 150 to securely couple wing 110 to wing shift device 150. In this way, wing 110 may be shifted forward (i.e., towards the nose of aircraft) or aft (i.e., towards the tail of aircraft) and secured to wing shift device 150 at a particular position due to the arrangement of apertures 215, 305 of wing shift device 150 and the apertures of wing 110.

This disclosure also contemplates that wing 110 may be mechanically shifted along wing shift device 150. In some embodiments, aircraft 100 includes a controller (not illustrated) that is communicably coupled to one or more motors (not illustrated) that are configured to move wing 100 forward and aft along fuselage 120. The controller may be configured to provide instructions to the motors via any appropriate communications link (e.g., wired or wireless). In some embodiments, the controller includes or is a computer system. As an example, in response to receiving an instruction from a controller, wing 110 automatically shifts from a first position along wing shift device 150 to a second position, the second position being a position where the aircraft's center of lift 170 is aligned with its center of gravity 160. Thus, this disclosure recognizes automation of repositioning wing 110 due to changes in payload 130 and center of gravity 160.

In operation, wing shift device 150 is coupled to fuselage 120 at a desired location along or within fuselage 120. In some embodiments, wing shift device 150 is coupled to fuselage 120 using fasteners 115. For example, wing shift device 150 may be coupled to fuselage 120 by securing fasteners 115 through apertures 215 of wing shift device 150. Aircraft 100 may then be loaded or secured with payload 130 (e.g., crew, passengers, cargo, equipment, etc.). The position of payload 130 on or within aircraft 100 may change the location of center of gravity 160. Wing 110 may then be coupled to wing shift device 150 (e.g., by using fasteners 115) at a position which aligns center of lift 170 and center of gravity 160 of aircraft 100. This alignment balances aircraft 100 and aircraft 100 is now ready for flight.

Aircraft 100 may be used in a subsequent flight for a different purpose but may need to be rebalanced to ensure safety and efficiency. This is because a change in the weight of payload 130 or the positioning of payload 130 may result in a misalignment of the aircraft's center of gravity 160 and center of lift 170. For example, in FIG. 1, payload 130 is secured to aircraft 100 near its tail. By securing payload 130 at this position along fuselage 120, center of gravity 160 of aircraft 100 is shifted aft (toward the tail of aircraft 100) and is no longer aligned with center of lift 170 of aircraft 100. As a result, aircraft 100 does not have optimal balance. Therefore, center of gravity 160 may be realigned by shifting wing 110 aft along wing shift device 150 to accommodate for the change in payload 130 and center of gravity 160.

Using wing shift device 150 as set forth herein may eliminate aircraft 100's need for ballast and improve its performance and payload capacity. Aircraft 100 may simply undergo a quick reconfiguration before each flight to account for any changes in payload 130 and center of gravity 160. This is in contrast to the onerous and time-intensive task of rearranging the payload (e.g., persons, equipment, fuel, etc.) and/or adding a calculated amount of ballast to aircraft 100 before each flight.

FIG. 4A-4D illustrate example uses of wing shift device 150 according to certain embodiments of the present disclosure. Wing shift device 150 may be used with various configurations of aircraft 100 including those with a high-wing mount (i.e., wing 110 coupled to a top portion of fuselage 120), a mid-wing mount (i.e., wing 110 coupled to an interior portion of fuselage 120), a low-wing mount (i.e., wing 110 coupled to a bottom portion of fuselage 120) and a side-wing mount (i.e., wing 110 coupled to side portions of fuselage 120). Each of these configurations are described in more detail below with respect to FIGS. 4A-4D.

Figure 4A:
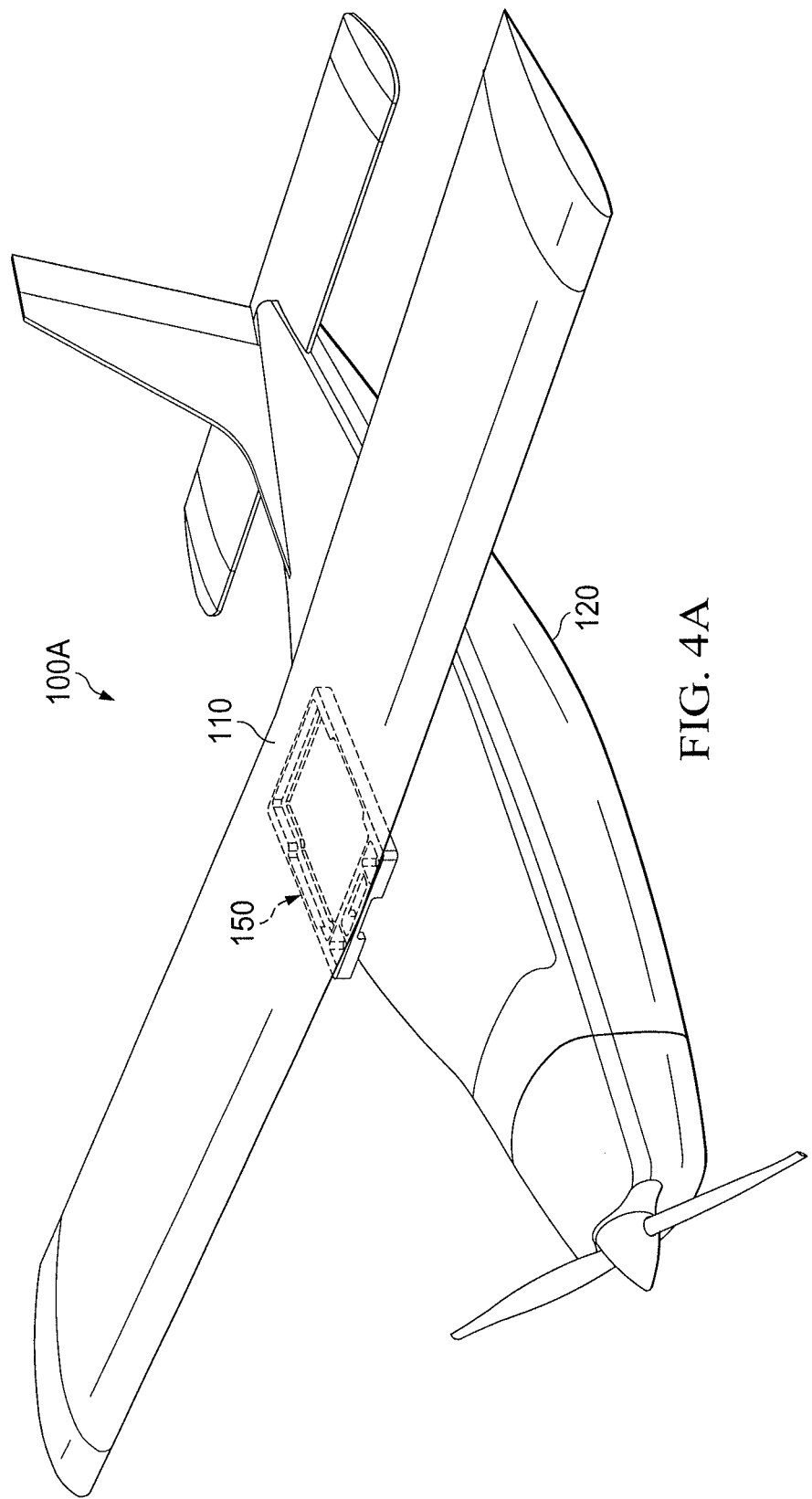

FIG. 4A illustrates wing shift device 150 installed on a high-wing mount aircraft 100A. In such an embodiment, wing shift device 150 may be coupled to a top portion of fuselage 120 and wing 110 may be coupled to a distal surface (e.g., top surface 310) of wing shift device 150. In some embodiments, wing 110 is affixed to top surface 310 of wing shift device 150 using fasteners 115. In some embodiments, realigning center of lift 170 with center of gravity 160 as discussed herein may require shifting wing 110 in the forward or aft direction along the distal surface of wing shift device 150.

FIG. 4B illustrates wing shift device 150 installed on a mid-wing mount aircraft 100B. In such an embodiment, wing shift device 150 may be coupled to an interior portion of fuselage 120. The fairings and fuselage 120 of mid-wing mount aircraft 100B include sufficient space to accommodate the shifting of wing 110 along wing shift device 150.

Fuselage 120 on mid-wing mount aircraft 100B may comprise a plurality of apertures 410 configured to permit wing 110 to pass through fuselage 120. In some mid-wing mount aircraft embodiments, wing 110 may be coupled to top surface 310 of wing shift device 150. In some other mid-wing mount aircraft embodiments, wing 110 may be coupled to bottom surface 315 of wing shift device 150. Although wing 110 is coupled to an interior portion of fuselage 120, in some embodiments, fuselage 120 is configured to permit wing 110 to be easily shifted along wing shift device 150. For example, fuselage 120 of mid-wing mount aircraft 100B may comprise a top half and a bottom half. In such an embodiment, the fuselage halves are separable from one another. Separating the top fuselage half from the bottom fuselage half exposes wing shift device 150 and allows wing 110 to be shifted forward or aft on wing shift device 150 depending on changes in center of gravity 160 or payload 130. Once realignment has been achieved, the fuselage halves may be recoupled for flight. Although this example illustrates a particular configuration, other suitable fuselage configurations are contemplated that allow shifting of wing 120 along wing shift device 150 in mid-wing mount aircraft 100B.

Figure 4C:
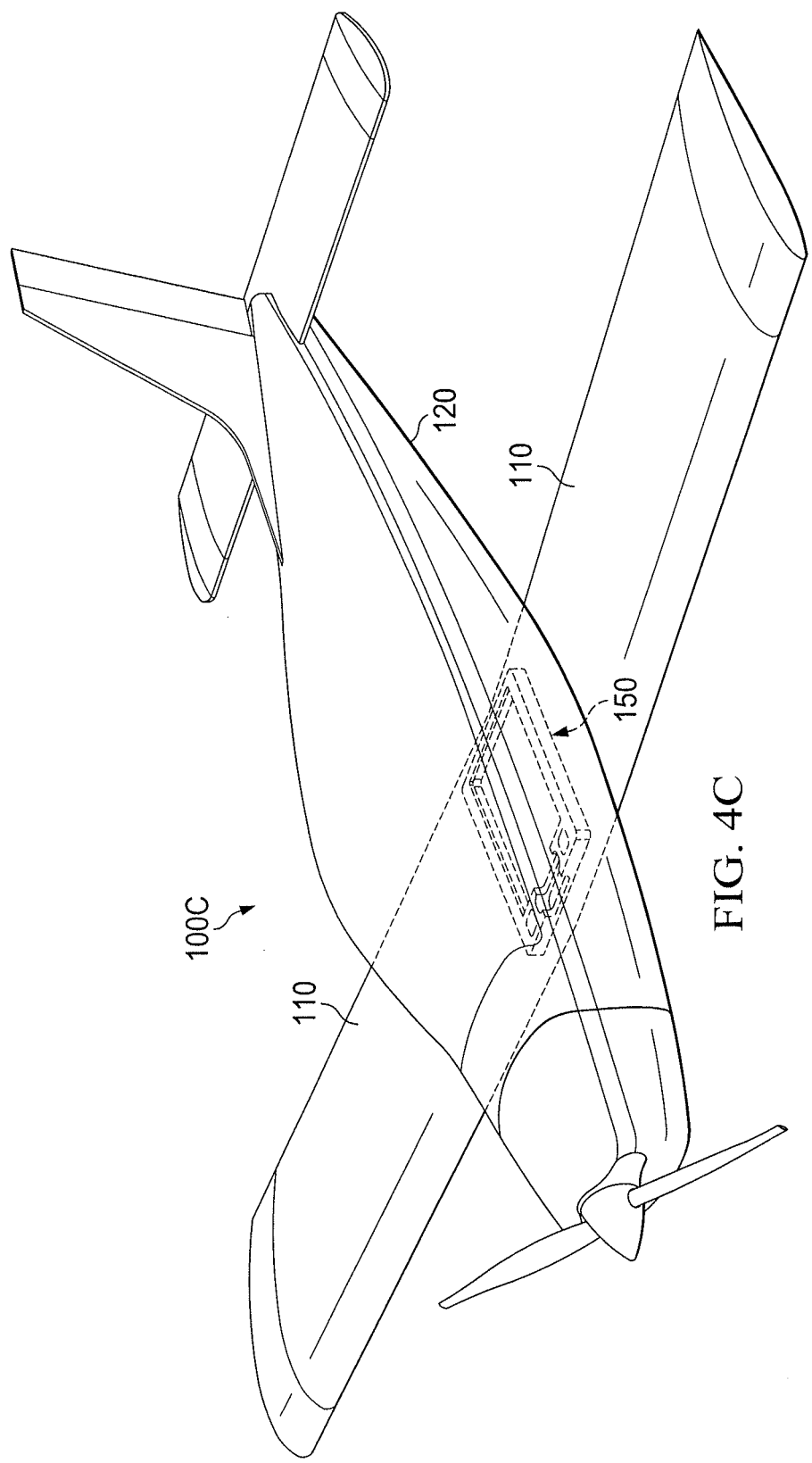

FIG. 4C illustrates wing shift device 150 installed on a low-wing mount aircraft 100C. In such an embodiment, wing shift device 150 may be coupled to a bottom portion of fuselage 120 and wing 110 may be coupled to a distal surface (e.g., top surface 310) of wing shift device 150. In some embodiments, realigning center of lift 150 with center of gravity 160 as discussed herein may require shifting wing 110 in the forward or aft direction along the distal surface of wing shift device 150.

Figure 4D:
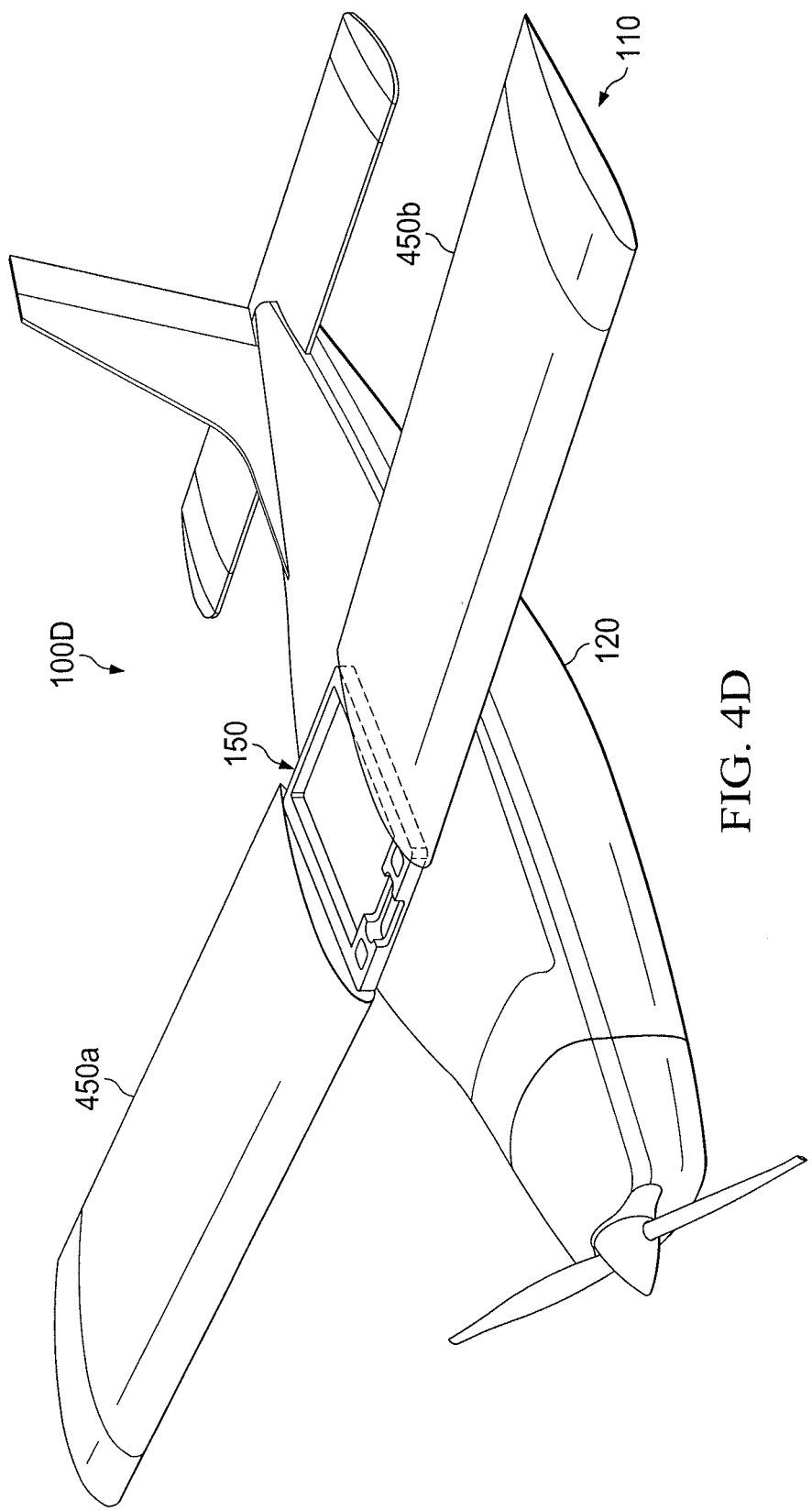

FIG. 4D illustrates wing shift device 150 installed on a side-wing mount aircraft 100D. In some side-wing mount embodiments, wing 110 includes two portions, a first side wing 450a and a second side wing 450b. Side wings 450 may be symmetrical and be coupled to side surfaces 320 of wing shift device 150 using apertures 305. In other embodiments, side wings 450 may be symmetrical and coupled to the distal surface (e.g., top surface 310) of wing shift device 150 using apertures 215.

For example, as depicted in FIG. 4D, wing 110 of aircraft 100D includes side wing 450a and side wing 450b. Wing shift device 150 is coupled to a top portion of fuselage 120. Fasteners 115 may be used to couple side wings 450 to wing shift device 150. Fasteners 115 may secure side wings 450 through apertures 305 along side surfaces 320 of wing shift device 150. In some embodiments, affixing side wings 450 to side surfaces 320 of wing shift device 150 results in a horizontal orientation of fasteners 115. Although FIG. 4D illustrates side wings 450 affixed to side surfaces 320 of wing shift device 150, any suitable mounting positions for side wings 450 may be used. For example, side wings 450 may be affixed to the distal surface (e.g., top surface 310) of wing shift device 150 through apertures 215. In some embodiments, affixing side wings 450 to the distal surface of wing shift device 150 results in a vertical orientation of fasteners 115.

Additionally, although FIG. 4D depicts wing shift device 150 coupled to a top portion of fuselage 120, this disclosure recognizes that wing shift device 150 may be coupled to any suitable portion of fuselage 120. For example, in some embodiments, wing shift device 150 on side-wing mount aircraft 100D may be coupled to a bottom portion of fuselage 120. In other embodiments, wing shift device 150 on side-wing mount aircraft 100D may be coupled to an interior portion of fuselage 120.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An unmanned aerial vehicle (UAV) comprising:
a fuselage;
a wing; and
a wing shift device configured to be coupled to the fuselage, the wing shift device being generally rectangular in shape and comprising a plurality of apertures for coupling the wing to the UAV, wherein:
the plurality of apertures are positioned along a first side and a second side of the wing shift device, the first side and the second side being generally parallel to each other; and
the plurality of apertures are configured to permit the wing to be shifted in a forward or aft direction along the fuselage based on a center of gravity of the UAV.

2. The UAV of claim 1, wherein the wing is detachable from the UAV and is configured to be coupled to the wing shift device using one or more fasteners.

3. The UAV of claim 1, wherein the wing shift device is removably coupled to the fuselage.

4. The UAV of claim 1, wherein the wing shift device is coupled to a top portion of the fuselage.

5. The UAV of claim 1, wherein the wing shift device is coupled to a bottom portion of the fuselage.

6. The UAV of claim 1, wherein:
the wing shift device is coupled to an interior portion of the fuselage; and
the fuselage comprises a plurality of apertures configured to permit the wing to pass through the fuselage.

7. The UAV of claim 1, wherein the wing shift device further comprises an aeroskirt configured to decrease drag.

8. The UAV of claim 1, wherein the UAV is configured to fly without ballast.

9. The UAV of claim 1, wherein the wing is affixed to the wing shift device at a position which aligns the center of gravity of the UAV with a center of lift of the wing.

10. The UAV of claim 1, wherein:
the wing comprises a first portion and a second portion;
the wing shift device comprises a first side and a second side; and
the first wing portion couples to the first side of the wing shift device and the second wing portion couples to the second side of the wing shift device.

11. An aircraft comprising:
a wing; and
a wing shift device configured to be coupled to the aircraft, the wing shift device being generally rectangular in shape and comprising a plurality of apertures for coupling the wing to the aircraft, wherein:
the plurality of apertures are positioned along a first side and a second side of the wing shift device, the first side and the second side being generally parallel to each other; and
the plurality of apertures are configured to permit the wing to be shifted in a forward or aft direction based on a center of gravity of the aircraft.

12. The aircraft of claim 11, wherein the wing is detachable from the aircraft and is configured to be coupled to the wing shift device using one or more fasteners.

13. The aircraft of claim 11, wherein the wing shift device is removably coupled to the aircraft.

14. The aircraft of claim 11, wherein the wing shift device is coupled to a top portion of the aircraft.

15. The aircraft of claim 11, wherein the wing shift device is coupled to a bottom portion of the aircraft.

16. The aircraft of claim 11, wherein:
the wing shift device is coupled to an interior portion of the aircraft; and
the aircraft comprises a plurality of apertures configured to permit the wing to pass through the aircraft.

17. The aircraft of claim 11, wherein the wing shift device further comprises an aeroskirt configured to decrease drag.

18. The aircraft of claim 11, wherein the aircraft is configured to fly without ballast.

19. The aircraft of claim 11, wherein the wing is affixed to the wing shift device at a position which aligns the center of gravity of the aircraft with a center of lift of the wing.

20. The aircraft of claim 11, wherein:
the wing comprises a first portion and a second portion;
the wing shift device comprises a first side and a second side; and the first wing portion couples to the first side of the wing shift device and the second wing portion couples to the second side of the wing shift device.

\* \* \* \* \*